United States Patent [19]

Mühle et al.

[11] Patent Number: 4,642,862
[45] Date of Patent: Feb. 17, 1987

[54] STONE ROLLER FOR PAPER MAKING MACHINES

[75] Inventors: Erwin Mühle; Hermann Rahmig, both of Heidenheim, Fed. Rep. of Germany

[73] Assignee: J.M. Voith GmbH, Fed. Rep. of Germany

[21] Appl. No.: 840,405

[22] Filed: Mar. 17, 1986

[30] Foreign Application Priority Data

Mar. 27, 1985 [DE] Fed. Rep. of Germany ....... 3511038

[51] Int. Cl.⁴ .................. B31B 31/08; B02C 19/00
[52] U.S. Cl. .................................. 29/132; 29/123; 29/148.4 D; 241/293; 51/206.4
[58] Field of Search .................. 29/148.4 D, 132, 130, 29/123, 125; 241/293, 294, 295; 51/206, 206.4

[56] References Cited

U.S. PATENT DOCUMENTS

| | | | |
|---|---|---|---|
| 1,132,258 | 3/1915 | Hall | 241/293 |
| 1,518,422 | 12/1924 | Greene . | |
| 2,141,608 | 12/1938 | Larsson | 51/206.4 |
| 2,450,226 | 9/1948 | Beth | 51/206.4 |
| 2,450,227 | 9/1948 | Beth | 51/206.4 |
| 3,077,640 | 2/1963 | Owen | 29/123 |
| 3,620,462 | 11/1971 | Dooley, Jr. | 241/294 |
| 4,272,873 | 6/1981 | Dietrich . | |

FOREIGN PATENT DOCUMENTS

| | | | |
|---|---|---|---|
| 458626 | 8/1949 | Canada | 51/206 |
| 2038203 | 7/1980 | United Kingdom | 241/293 |

Primary Examiner—Howard N. Goldberg
Assistant Examiner—Irene Graves Golabi
Attorney, Agent, or Firm—Ostrolenk, Faber, Gerb & Soffen

[57] ABSTRACT

A stone roller for paper making machines having a tubular body made of stone with an axial borehole. A plurality of tie-rods extend along the inner wall of the borehole and parallel to its axis. The tie-rods are used to clamp plates against the two ends of the roll body. A corepiece, sealingly connected to both clamping plates, is disposed within the borehole, creating an annular space sealed off from the central region of the bore. The tie-rods extend through the annular space. The space is filled with a plastic which is introduced in liquid form at room temperature and then hardened. The hardened plastic prevents the tie-rods from vibrating and shields them from corrosive elements.

22 Claims, 8 Drawing Figures

STONE ROLLER FOR PAPER MAKING MACHINES

BACKGROUND OF THE INVENTION

The present invention relates to stone rollers, particularly for paper making or cardboard manufacturing machines. The roller body of a stone roller is typically comprised of natural stone such as granite, although artificial stone, such as concrete polymer, can also be used.

An example of a stone roller is disclosed in U.S. Pat. No. 4,272,873. As shown in FIG. 1 of that patent, an axial borehole of relatively large cross-section is formed in the roller body. Several tie-rods extend through the borehole and serve to connect together a pair of disk-shaped end clamping plates. The tie-rods are held by nuts which clamp the clamping plates against the ends of the roller body. Journals which rest in bearings are screwed onto the clamping plates, which enable the roller to rotate easily and provide end support for the roller. In another embodiment, shown in FIG. 2 of U.S. Pat. No. 4,272,873, the clamping plates and journals are formed together as a single piece. Either of these clamping plate/journal configurations can be used with the present invention.

In the embodiment shown in FIG. 1 of U.S. Pat. No. 4,272,873, the tie-rods are all placed relatively close radially to the inner wall of the borehole, so that the center of the stone roller is comprised merely of filler material, e.g. concrete. This construction contrasts with prior stone rollers in which a single, thick tie-rod was extended through the center of the stone roll. The present invention can only be used in conjunction with a stone roller of the type shown in FIG. 1 of U.S. Pat. No. 4,272,873, i.e. with a central borehole in the roller body. The other embodiment, shown in FIG. 2 of U.S. Pat. No. 4,272,873, in which a separate borehole is provided for each tie-rod near the outer wall of the roller body has many of the advantages of the present invention (described below), but it is quite difficult to manufacture such boreholes.

In the stone roller shown in FIG. 1 of U.S. Pat. No. 4,272,873, the tie-rods are embedded in the hardened concrete filler material. Since the tie-rods are thus rigidly bonded over their entire length to the roller body, they are prevented from vibrating or flexing under centrifugal force, and are shielded from corrosive elements.

One disadvantage of the stone roller embodiment shown in FIG. 1 of U.S. Pat. No. 4,272,873 is that a very large amount of filler material is required since the entire interior of the roller body must be filled. This makes the finished stone roller unnecessarily heavy and quite expensive to manufacture. Furthermore, the ends of the tie-rods which pass through the clamping plates are not sufficiently, if at all, covered by the filler material, and thus additional measures are required to protect them from corrosion.

Others have attempted to eliminate tie-rod oscillation by rigidly clamping the tie-rods in several stages along the axial length of the roller. This construction, however, is unsatisfactory because of the difficulty involved in assembly.

SUMMARY OF THE INVENTION

The object of the present invention is to provide an improved stone roller which is relatively lightweight and inexpensive in which the tie-rods are prevented from vibrating and are shielded from corrosion.

The present invention achieves this object by means of a unique construction in which a corepiece, disposed in the central borehole of the roller, dramatically reduces the volume of filler material necessary to secure the tie-rods in the borehole. The filler material is a fluid at room temperature which releases heat upon hardening. The filler material can thus be introduced to the borehole without preheating or at a temperature which is only slightly above room temperature. This reduces the risk of fracture to the stone roller body. Also, due to its liquidity during the filling, the filler material completely fills all cavities between the roller body and the corepiece (including the bores in the clamping plates through which the tie-rods extend), and thus offers greater protection against corrosion than is obtained in prior stone rollers.

Up to now, it was not possible to use a liquid filler material because of the heat developed upon hardening. This heat could fracture the body of the stone roller if—as in prior stone rollers—the entire central borehole was filled with filler material. In the present invention, the corepiece disposed in the borehole greatly reduces the volume of the cavity to be filled with the filler material, so that only a relatively small amount of heat is produced upon hardening of the filler material, and the risk of fracture to the stone body is greatly reduced.

It is important that the filler material fill the cavity, both in its initial liquid state and also upon hardening; in other words, the filler material must not shrink substantially upon hardening.

In the press portion of modern paper making machines (where the stone roller of the present invention is used), steam blow boxes for increasing the temperature of the web of paper are employed for drying the paper web. This leads, inter alia, to a heating of the stone roller over which the web of paper travels. As the temperature of the body of the stone roller increases, there is a risk that the tie-rods will not be heated uniformly within the body of the stone roller. In other words, there is a risk that, due to the lengthening of the stone roller body caused by the increase in temperature—with the temperature of the tie-rods initially remaining substantially constant—the tie-rods will be overstressed. There is also the risk that after a lengthy period of operation in which the tie-rods have reached the same high temperature as the body of the stone roller, cooling of the stone roller body takes place. Since the tie-rods retain heat longer than the stone roller, the tensile force in the tie-rods is decreased upon the shrinkage of the stone roller body. Although this lasts only temporarily (when the tie-rods finally cool down their tensile force increases again), nevertheless the clamping force between the clamping plates and the ends of the stone roller body is temporarily decreased. Thus, the friction lock between the stone roller body and the clamping plates is at least momentarily absent, and there is a risk that the stone roller could be destroyed. The present invention reduces this risk in two ways: first, the present invention has a plurality of tie-rods disposed off-center (rather than having a single central tie-rod); and second, the filler material adheres completely to the stone roller body and to the tie-rods (primarily due to the very slight decrease in volume of the filler material upon hardening) so that the unimpeded transfer of heat can occur between the stone roller body and the tie-rods. This heat transfer can be further increased if necessary by mixing a substance of high thermal conductivity with the filler material (for example, aluminum powder, graphite, or the like).

The relatively small decrease in volume of the filler material upon hardening, and the complete filling of the space between the roll-body borehole and corepiece which results therefrom, serve to prevent the tie-rods from oscillating to a greater degree than was previously obtainable.

In another embodiment of the invention, a two-component plastic is used as the filler material. From the numerous known two-component plastics, it is possible to select a few which have the advantage described above, namely high liquidity at room temperature and low shrinkage (less than 0.5%), and which also have the following desirable properties:

low density (about 1 kg/dm$^3$);

good adherence to the stone roller body and to the steel tie-rods;

slow hardening, the amount of heat produced per unit of time and the total rise in temperature being comparatively low;

the components are free of volatile solvents and do not give off any volatile or liquid substances upon hardening of the plastic; and after hardening, the plastic has a certain elasticity which lasts for years (even at relatively high operating temperature); in other words, there is no tendency for the plastic to become brittle.

Two-component plastics which possess these properties are known by the following designations:

A. The resin component is an epoxy plastic having a base of Biphenol A mixed with reactive diluent.

B. The hardener component is preferably an aliphatic polyamide to which additives have been added which reduce the settling and/or flocculating out of individual components.

A two-component resin consisting of "Araldit M (CY 212)" and of "Hardener HY 1022 BD", both manufactured by CIBA-GEIGY, has proven particularly suitable in tests.

The corepiece can theoretically have the shape of a solid, predominantly cylindrical body, formed of plastic, which is arranged concentrically within the roll body. However, it is preferably for the corepiece to be shaped as a hollow inner shell, formed of a sheet-metal cylinder, which is sealed to the two clamping plates. In the latter case, the central space which is bounded by the inner shell remains hollow, i.e. in the filler material it does not penetrate into the central inner space.

Other objects and features of the invention are described below, with reference to the accompanying drawings.

DESCRIPTION OF THE PREFERRED EMBODIMENT

Figures 1, 2:
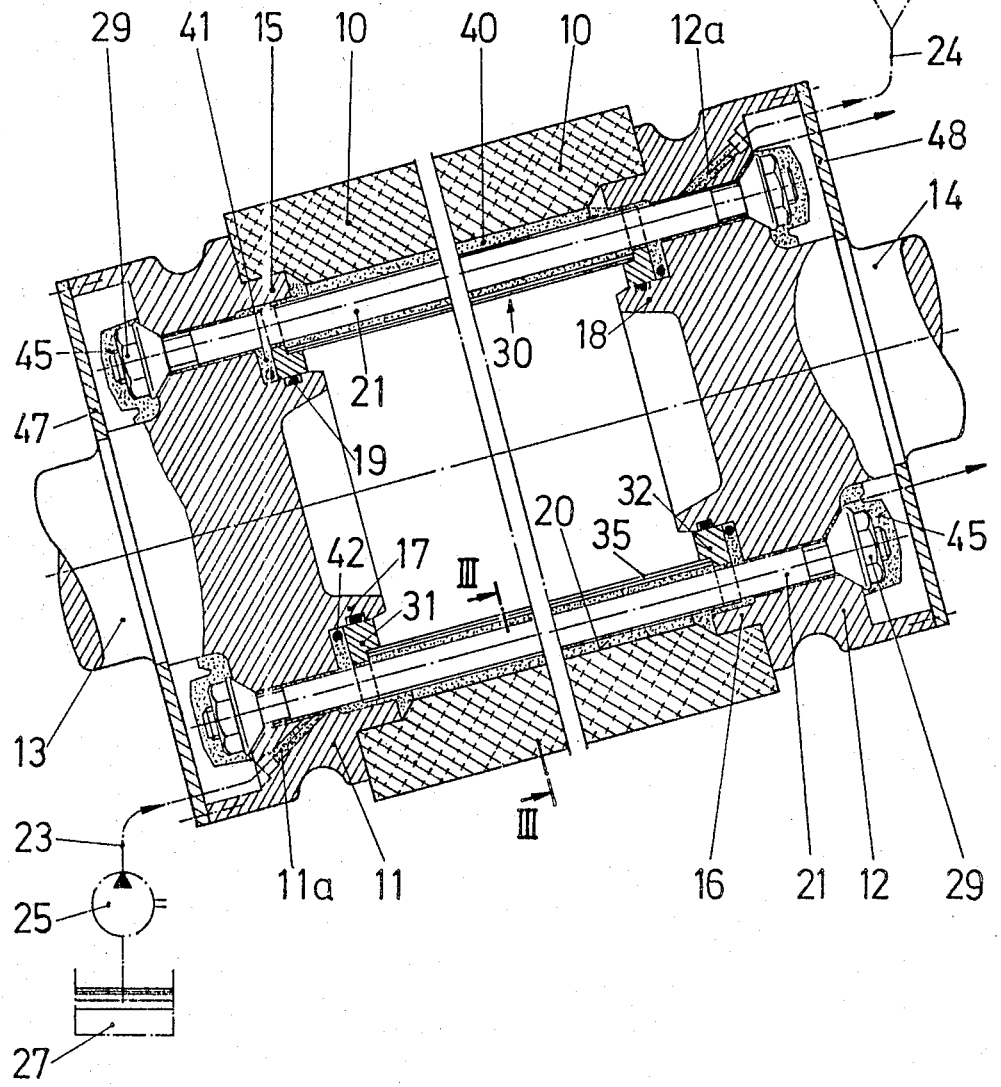
FIGS. 1 and 2 are axial cross-sectional views through opposite end sections of a stone roller according to the present invention, with the tie-rods embedded in the filler material.
Figure 7:
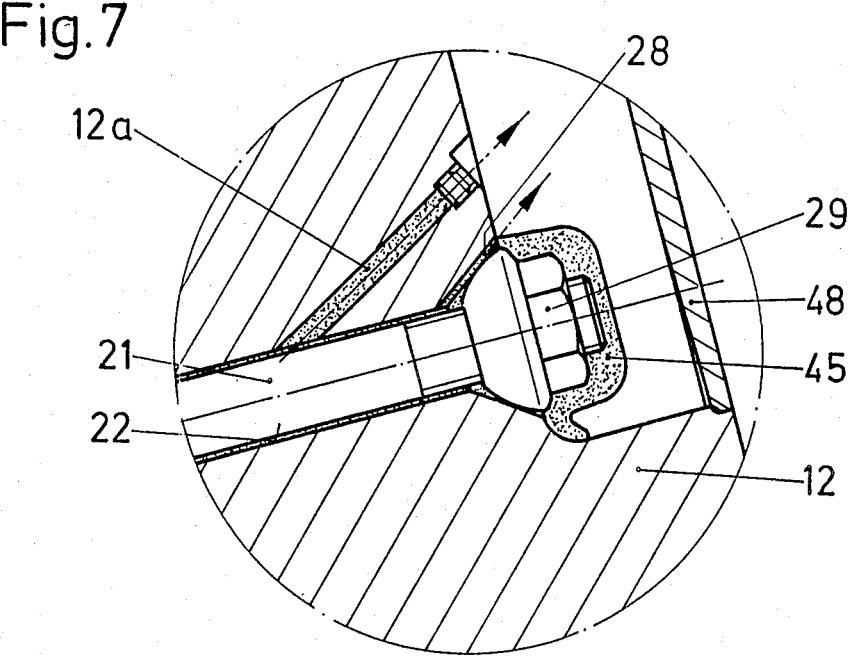
FIG. 7 shows another portion of FIG. 2, also on a larger scale.
Figure 8:
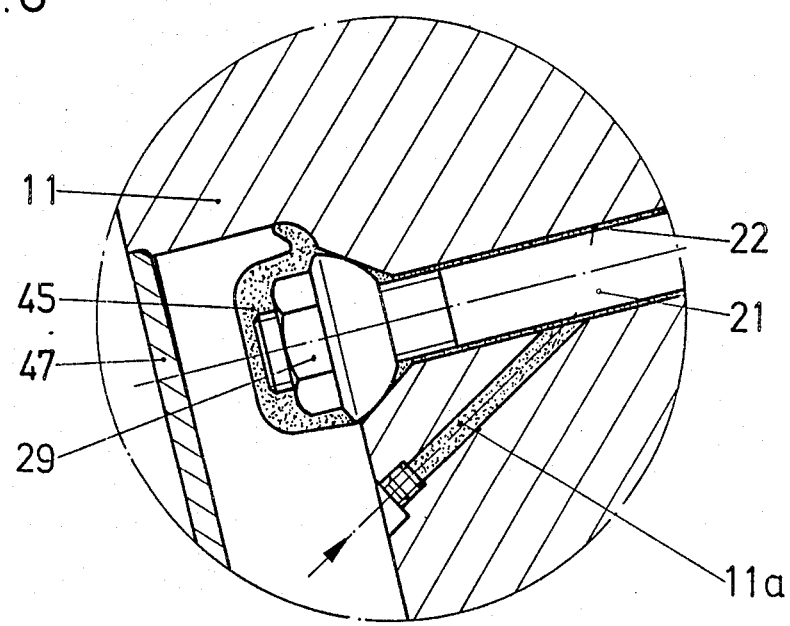
FIG. 8 shows a portion of FIG. 1, again on a larger scale.

The stone roller shown in FIGS. 1 and 2 has a roller body 10 made of stone, preferably natural stone (for instance granite). At each end of the roller is a disk-shaped clamping plate 11, 12 with a journal 13, 14 respectively formed thereon. A stone roller body 10 has a central borehole 20 extending axially through it. The inside diameter of the hole is relatively large, as compared with the outside diameter of the roller body. For the centering of the stone roller body 10, each clamping plate 11, 12 has a collar 15, 16, respectively. In order to clamp the clamping plates 11, 12 to the stone roller body, a plurality of tie-rods 21 are provided which are radially disposed close to the wall 20 of the borehole and extend from one clamping plate to the other. As shown in FIGS. 7 and 8, the tie-rods 21 pass through holes 22 in clamping plates 11, 12. Holes 22 are conically beveled on their outer ends to receive the conical or spherical seat of the clamping nuts 29.

Figure 3:
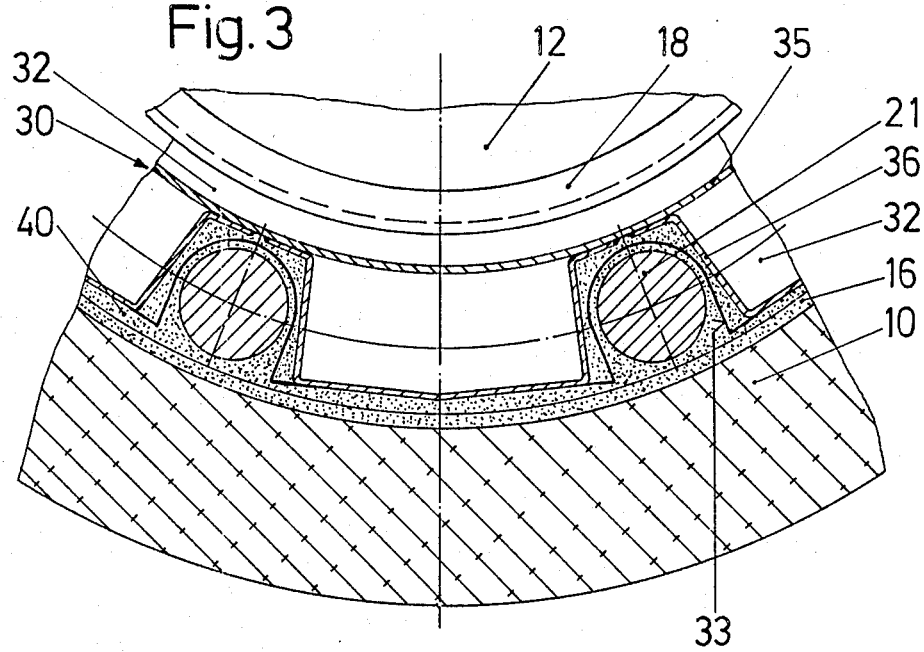
FIG. 3 is a partial cross-section along the line III—III of FIG. 1, on a larger scale.

A corepiece 30 is provided in the shape of an inner annular shell which separates the tie-rods 21 from the central region of the borehole 20. The corepiece or inner shell 30 comprises a tubular support body 35 (see FIG. 3) which is made of relatively thin sheet metal and of a plurality of filler pieces 36 in a number equal to the number of tie-rods 21. The filler pieces are made of bent sheet metal and fastened to the outside of the support member 35. The filler pieces extend into the spaces between adjacent tie-rods.

Figure 4:
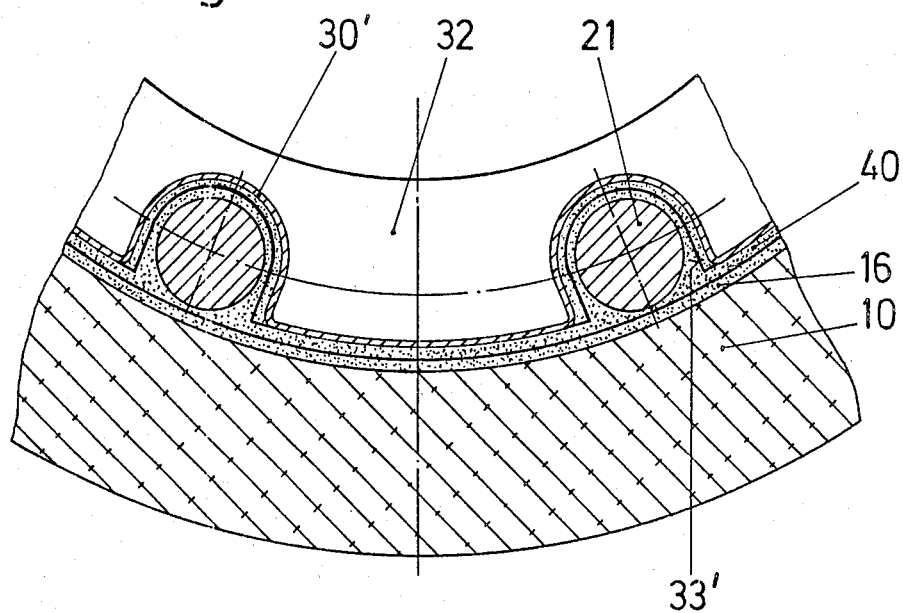
FIG. 4 shows an alternative to the embodiment of FIG. 3.

As an alternative, a single-piece profiled shell 30' can be provided, as shown in FIG. 4. In this embodiment, the volume of the hollow annular space filled with filler material 40 between the shell 30 or 30' and the roller body is as small as possible.

The shell 30 or 30' is provided at each end with a support ring 31 and 32. Each support ring has cutouts 33 and 33', respectively, near the tie-rods. The shell, together with the support rings, is centered on collars 17, 18 which are formed on the inside of the clamping plates 11, 12. Each of the centering surfaces is sealed by a sealing ring 19. Thus a hollow annular inner space is created between the wall 20 of the borehole of the stone roller body 10, the shell 30, and the region of the tie-rod holes 22 in the clamping plates 11, 12. This hollow space is vented through the filling and vent channels described below.

After the tie-rods have been clamped, this hollow annular space is filled, in accordance with the invention, with a plastic mixture 40 of thin liquid. To facilitate introduction of the plastic liquid, the stone roller is preferably oriented at an angle, as shown in FIGS. 1 and 2. In the lowermost region of the lower clamping plate 11 there is a filling channel 11a. This channel empties into one of the holes 22 (FIGS. 1 and 8). As shown diagrammatically, a filling pump 25 is connected by a filling line 23 to the filling channel 11a for the introduction of the plastic. The filling pump draws the liquid plastic from a supply container 27. In the uppermost region of the upper clamping plate 12, an overflow channel 12a is provided. An overflow line 24, discharging into an overflow receiving vessel 26, is connected to the overflow channel during the filling process (FIGS. 2 and 7).

Figure 5:
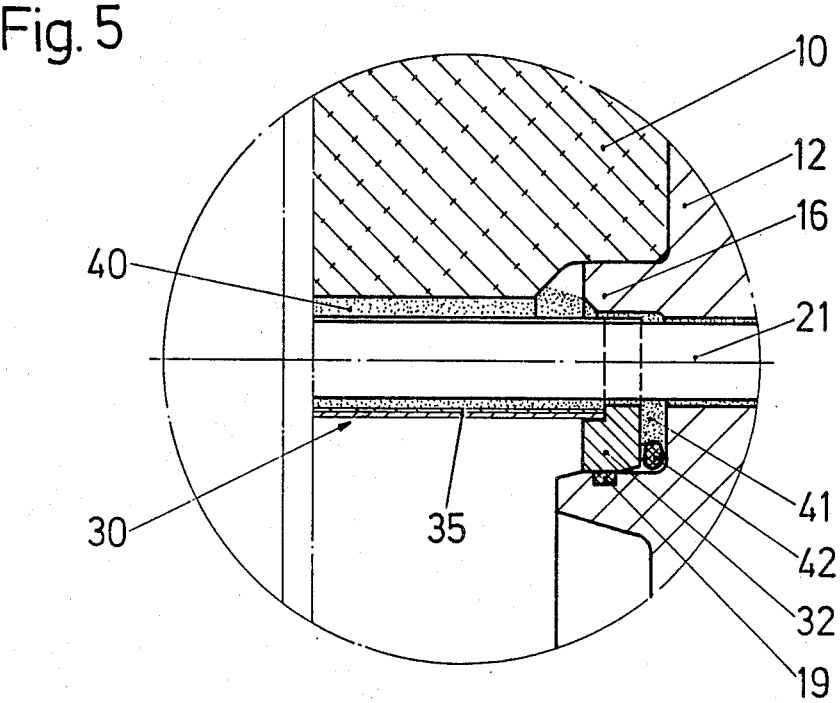
FIG. 5 shows a portion of FIG. 2 on a larger scale.
Figure 6:
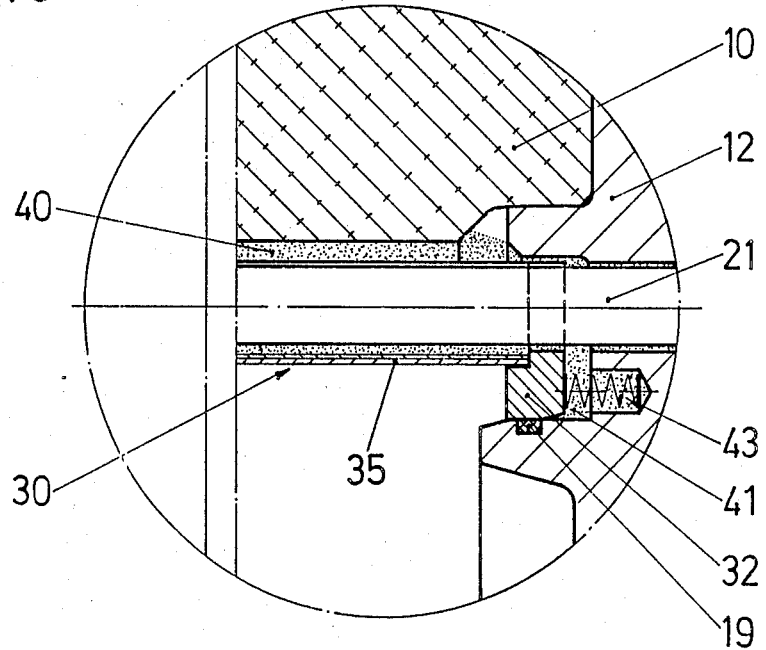
FIG. 6 shows an alternative to the embodiment of FIG. 5.

Each hole 22 is vented, preferably only on the upper clamping plate 12, via a vent channel 28 (see FIG. 7). So that the liquid plastic can reliably penetrate into the holes 22, a space 41 (FIGS. 5 and 6) is provided between each clamping plate 11, 12 and the adjacent support ring 31, 32, and the diameters of the holes 22 are configured to be a few millimeters larger than the outside diameter of the tie-rods 21.

The shell 30 should be centered as accurately as possible between the two clamping plates 11, 12. For this purpose, either a rubber ring 42 (FIG. 5) or several compression springs 43 (FIG. 6) are disposed in the spaces 41. The spaces 41 furthermore serve to compensate for manufacturing tolerance differences; i.e. the lengths of the roller body 10 and the shell 30 or 30' need not fit together exactly.

In order to further protect against corrosion, the outside of each clamping nut 29 is provided with a plastic covering 45, which is applied after the hardening of the filler material 40. Finally, the outer end of each clamping plates 11, 12 is covered by a cover 47, 48.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A stone roller for a paper making machine, comprising:
    a unitary roller body comprised of stone having a central borehole extending axially through the roller body, said roller body having opposite axial ends;
    a respective clamping plate positioned at each said axial end of said roller body;
    a plurality of tie-rods extending between said clamping plates and axially through said roller body, said tie-rods being adapted to draw said clamping plates together to place said roller body under axial stress, said tie-rods being embedded in a filler material, said filler material comprising a compound which is liquid at room temperature and which hardens without substantial shrinkage; and
    a corepiece disposed in said central borehole of said roller body, shaped and sized for creating a space for said tie-rods and said filler material between the inner surface of said roller body and said corepiece.

2. A stone roller as recited in claim 1, wherein each of said clamping plates having clamping nuts to clamp the clamping plate to the respective axial end of said roller body.

3. A stone roller as recited in claim 1, wherein said filler material comprises a two-component plastic.

4. A stone roller as recited in claim 3, wherein one component of said two-component plastic comprises an epoxy resin having a base of Biphenol A mixed with a reactive diluent and the other component comprises an aliphatic polyamine.

5. A stone roller as recited in claim 1, wherein an additional material of high heat conductivity is mixed with said filler material.

6. A stone roller as recited in claim 5, wherein said additional material comprises aluminum powder.

7. A stone roller as recited in claim 5, wherein said additional material comprises graphite.

8. A stone roller as recited in claim 1, wherein at least one of said clamping plates is provided with a vent channel to vent the space for said tie-rods between the inner surface of said roller body and said corepiece.

9. A stone roller as recited in claim 1, wherein said corepiece is formed in the shape of a shell, said shell being sealed to both of said clamping plates.

10. A stone roller as recited in claim 8, wherein said corepiece is formed in the shape of a shell, said shell being sealed to both of said clamping plates.

11. A stone roller as recited in claim 10, wherein said shell, in cross-section, extends between every two of said tie-rods at a slight distance from the inner wall of said borehole and extends toward the axis of said roller a slight distance away from each tie-rod around the side of each tie-rod.

12. A stone roller as recited in claim 11, wherein said shell comprises a support body having the shape of a cylinder, the diameter of which is slightly smaller than the distance between two opposite tie-rods and having filler pieces disposed axially outward which substantially fill up the open space between each two adjacent tie-rods.

13. A stone roller as recited in claim 9, wherein a support ring is provided on the two ends of said shell, a centering surface being formed on the inner side of each of said support rings which cooperates with a corresponding centering surface provided on each of said respective clamping plates to seat said support rings on said clamping plates.

14. A stone roller as recited in claim 12, wherein a support ring is provided on the two ends of said shell, a centering surface being formed on the inner side of each of said support rings which cooperates with a corresponding centering surface provided on each of said respective clamping plates to seat said support rings on said clamping plates.

15. A stone roller as recited in claim 14, wherein a seal is provided between said centering surfaces of said support rings and said clamping plates.

16. A stone roller as recited in claim 14, wherein an annular space is provided at each end of said inner shell between the outer end of said support ring and the inner surface of said respective clamping plate.

17. A stone roller as recited in claim 15, wherein an annular space is provided at each end of said inner shell between the outer end of said support ring and the inner surface of said respective clamping plate.

18. A stone roller as recited in claim 17, wherein at least one pressure clamping element is disposed on each end of said roller between said support ring and said respective clamping plate.

19. A stone roller as recited in claim 18, wherein said clamping element comprises an elastic ring.

20. A stone roller as recited in claim 19, wherein said clamping element comprises a plurality of compression springs.

21. A method of manufacturing a stone roller for a paper making machine, comprising:
    boring a central borehole in the stone roller extending axially through the stone roller body;
    providing a plurality of tie-rods extending axially through said borehole;
    providing a corepiece in the borehole of said roller body, thereby creating a space for said tie-rods between the inner surface of said roller body and said corepiece; and introducing a filler material in liquid state into said space and allowing said filler material to harden, whereupon said tie-rods become embedded in said filler material.

22. A method of manufacturing a stone roller as recited in claim 21, further comprising threading a plurality of nuts at the ends of said tie-rods, said nuts serving to clamp a pair of clamping plates to the respective ends of said roller body.

* * * * *